United States Patent [19]

Kirkhuff

[11] 4,443,258
[45] Apr. 17, 1984

[54] FIRE RETARDANT MATERIALS

[75] Inventor: William J. Kirkhuff, Irvine, Calif.

[73] Assignee: Kirkhuff, Shield & Fink, Santa Ana, Calif.

[21] Appl. No.: 343,880

[22] Filed: Jan. 29, 1982

Related U.S. Application Data

[63] Continuation-in-part of Ser. No. 214,220, Dec. 8, 1980, abandoned.

[51] Int. Cl.³ .................. C09D 5/18; C09D 1/00
[52] U.S. Cl. ................ 106/18.12; 106/281 R; 106/282; 106/286.8; 524/444
[58] Field of Search .......... 524/444, 492; 106/282, 106/18.12, 50, 286.8, 281 R

[56] References Cited

U.S. PATENT DOCUMENTS

| | | | |
|---|---|---|---|
| 2,634,208 | 4/1953 | Miscall | 92/3 |
| 2,640,786 | 6/1953 | Parsons | 106/282 |
| 2,884,380 | 4/1959 | Cook | 252/62 |
| 3,342,614 | 9/1967 | Koons | 106/15 |
| 3,978,018 | 8/1976 | Self | 106/304 |
| 4,011,195 | 3/1977 | Self | 106/83 |
| 4,176,115 | 11/1979 | Hartman | 524/444 |
| 4,193,898 | 3/1980 | Miller | 524/444 |
| 4,289,680 | 9/1981 | Kimura | 524/444 |
| 4,297,252 | 10/1981 | Caesar | 106/18.12 |

FOREIGN PATENT DOCUMENTS

| | | | |
|---|---|---|---|
| 528961 | 8/1956 | Canada | 106/282 |
| 2137271 | 6/1973 | Fed. Rep. of Germany | 106/18.12 |

*Primary Examiner*—John C. Bleutge
*Assistant Examiner*—Patricia Short
*Attorney, Agent, or Firm*—K. H. Boswell; Edward D. O'Brian

[57] ABSTRACT

A fire retardant material is formed by intimately associating the unexpanded form of perlite in association with a permeable mass of silica glass, said association is formed by permeating said perlite into said mass of glass. The composition comprises particles of unexpanded perlite less than 100 mesh and preferredly no larger than 200 mesh and the permeable glass comprises a glass fiber mat. The fire retardant material can be formed as a unified body capable of being applied onto other structural components or alternately, it can be intimately bonded to the surface of structural components as a veneer layer. Upon exposure to combustion temperatures the perlite expands from its unexpanded form to its expanded form at or near the deformation point of the glass mat followed by reaction of the perlite and the glass to form a flame-impenetrable ceramic.

21 Claims, No Drawings

FIRE RETARDANT MATERIALS

CROSS REFERENCE TO RELATED APPLICATIONS

This application is a continuation-in-part of my application entitled, FIRE RETARDANT MATERIALS, Ser. No. 214,220, filed Dec. 8, 1980, now abandoned, the entire disclosure of which is herein incorporated by reference.

BACKGROUND OF THE INVENTION

This invention is directed to a fire retardant material which utilizes a permeable mass of glass permeated with the unexpanded form of perlite. Upon exposure to combustion temperatures the heat expandable material expands followed by reaction of this material with the glass to form a ceramic.

It has been the goal of certain industries to produce structural materials such as roofing compositions and insulation which are capable of retarding the spread of flame in case of catastrophic fire in a building. To this end, certain specifications have been set up as guidelines in evaluating these materials for their flame retardant properties. Underwriters' Laboratory tests set forth specific parameters in tests of materials for their flame retardant abilities. UL test 790 includes Fire Brand tests as part of these parameters. The Fire Brand tests are rated such as Fire Brand A, Fire Brand B and Fire Brand C. The criteria of the A and B tests are very stringent and most products fail to meet them.

Certain inorganic compositions which themselves are not combustible have been incorporated into both roofing materials and insulation. Use of these materials, however, is governed by many factors. They, of course, must be available in large quantities and at an economical price. By their very nature, however, they tend to be extremely dense and thus impractical to use by themselves because of the structures needed to support their weight. Further, solid bodies of these inorganic materials tend to be extremely brittle. Although they have considerable compression strength, their sheer strength is extremely poor. For these reasons, if these materials are used it has been found necessary to normally incorporate them into matrices of other materials.

The above noted fire resistant materials include materials such as clays, silicas, glasses and minerals such as asbestos, expanded perlite and expanded vermiculite. Asbestos is not suited for most uses because of the health hazard associated with fine fibers within the lungs. Clays and the like are so extremely dense that their use is limited to certain installations, such as tile roofs, floor tiles and the like. Except for brick walls, the use of clays cannot be extended to walls. Expanded perlite and vermiculite have no structural strength when used neat, and thus cannot be used without other supporting materials.

Expanded perlite and vermiculite, however, have been found to be useful as fillers in insulation and to reduce the density of certain aggregates. In this regard other structural components are used to impart structural strength to the insulation or aggregate and the expanded perlite or vermiculite is added to this to form dead areas within the matrix of the structural material.

When the expanded perlite or vermiculite is used as a filler in insulation they impart very good fire retardant properties to the material. However, the matrix material which is used to support them in the past has either been extremely dense inorganic composition or has been a material which is susceptible to combustion, such as organic resins and the like. Examples of use of expanded perlite and vermiculite within matrices are found in U.S. Pat. Nos. 3,987,018; 4,011,195; 2,634,208 and 2,884,380. In these notes U.S. patents, which use an expanded composition in an organic matrix, the products described therein will only be useful at temperatures below that of the combustion point of the matrix material.

In a fire, the presence of an insulating material will help slow the heat spread from one area to an adjoining area. In addition to heat spread, it is also desirable to inhibit gas movement to seal off the fire. Thus, in addition to serving as an insulating material, materials which are effectively impenetrable to gas movement assist in preventing flame spread by inhibiting oxygen availability to the source of the combustion. Those insulating materials which are either porous or which have a combustible matrix are therefore of little utility in inhibiting movement of oxygen to the source of the flame.

In view of the above discussion it is evident that there exists a need for materials which are capable of serving as insulators and flame spread preventers or inhibitors. Certain presently used construction materials, such as concrete or metals, can serve to meet this need. However, in certain structures their use is precluded by either their weight, their cost, or architectural considerations. In these types of structures the need for efficient fire retardant materials has not yet been satisfied.

BRIEF SUMMARY OF THE INVENTION

It is an object of this invention to provide new and improved fire retardant materials which are capable of inhibiting the spread of combustion by both forming an insulative heat barrier and a gas inhibiting barrier. It is a further object of this invention to provide such flame retardant materials which are composed of essentially inexpensive and readily available materials and which are adaptable to a variety of applications such as both roofing materials and in-wall and floor insulation.

These and other objects as will become evident from the remainder of this application are achieved by a fire retardant material which comprises a quantity of a permeable mass of a silica based glass; a quantity of the unexpanded form of perlite, said quantity of said unexpanded perlite present as a multiplicity of particles, said particles permeated among and associated with said permeable mass of glass, said particles being of a size sufficiently small to be retained in said association with said permeable mass of glass upon conversion of said composition from said unexpanded form to its expanded form when subjected to heat.

In the presently preferred form of the invention, the perlite is of a mesh size less than 100 mesh and more preferredly equal to or less than 200 mesh and the glass is present as a glass fiber structure such as a mat or fabric. The association of the perlite with the glass can be assisted by the use of a binding agent. Perferredly, the binding agent would be an agent which would be resistant to normal ambient environmental stresses such as wind, water, and hot and cold expansion and contraction.

In the fire retardant material the perlite would be present in an unexpanded form in at least equal weight with the weight of the glass. However, preferredly the perlite would be present in a percentage by weight of the total material in an amount several times greater than the amount by weight of the glass.

When used as a roofing composition, preferredly a glass fiber mat having a density greater than 0.9 lbs. per 100 sq. ft. is used and a binder which is essentially weather-resistant is used to maintain the association of the perlite with the glass fibers.

This invention utilizes certain principals and/or concepts which are set forth in the claims appended to this specification. Those skilled in the construction arts will realize that these principals and/or concepts are capable of being utilized in a variety of individual materials differing from those used for illustrative purposes herein. For this reason, this invention is to be construed in light of the claims and is not to be construed to be limited to the exact illustrated examples used herein.

DETAILED DESCRIPTION

I have found that heat expandable perlite can be positioned in its unexpanded state in and among the individual fibers, particles, etc., of certain permeable masses of silica based glass and maintained there when the perlite expands from its unexpanded state to its expanded state, if in fact the perlite is of a particle size when it is associated with the glass in its unexpanded state.

Further, I have found that the above noted expandable perlite, after expansion, while being retained in an intimate association with the glass will form a structurally stable ceramic when exposed to high heat which provides an inhibiting barrier for gas movement (particularly oxygen) from one side of the ceramic to the other.

In certain applications, to assist in maintaining the unexpanded form of the heat expandable perlite in association with the permeable mass of glass, binders can be added. Normally these binders would be added in order to maintain the above noted association intact for long periods of time during the life of the structure on which the fire retardant material of the invention would be used. In certain uses of the invention, the fire retardant material would form the outer layer on the structure and thus a weather-resistant binder would be used in association with the permeable glass and the unexpanded form of the heat expandable perlite. In other instances, a binder might be incorporated in order to maintain the permeable glass and the unexpanded form of the heat expandable perlite in position within the interior of the structure, such as use on walls or on ceilings and other such installations. In other instances, wherein the glass and the unexpanded form of the heat expandable perlite are essentially isolated from the environment, a binder would not be required, but in fact portions of the structure on which they are used would serve to insure maintenance of the intimate relationship between the permeable glass and the unexpanded form of the heat expandable composition.

In other uses of the invention, layers of permeable glasses, each having the unexpanded from of the heat expandable perlite permeated therein, would be joined together with appropriate binders. In one specific instance, the glass itself will also serve as a binder. Thus, when water soluble sodium silicates are used as the glass, this effect is present.

The heat expandable perlite useful in the invention is material that is capable of expanding from its unexpanded state to its expanded state at an elevated temperature greater than 1200° F. This is a natural product, economically obtainable, which includes within its structure water as an expanding agent.

A related material, obsidian, is generally differentiated from perlite by its lower water content. For purposes of this specification, those obsidians containing sufficient water such that they are heat expandable, at or about the expansion temperature of perlite, are considered to be included in the classification of perlite.

For the purposes of this specification and the claims appended hereto, the word "glass" is not to be construed utilizing a strictly physical definition which would include all vitreous amorphous solids and other solids which are in fact crystalline, but on a macro scale appear to be vitreous amorphous solids. As used herein, the word "glass" is construed to include certain chemical composition limitations, limiting it to silica based vitreous amorphous solids. As noted in the preceding, the material of the invention, upon exposure to sufficient heat, forms a structurally stable ceramic. The formation of the ceramic requires the presence of both the perlite of the invention and a suitable silica based glass.

Excluded from the scope of the word "glass" as utilized in this specification and the claims appended hereto, are certain materials such as those materials noted as glass ceramics which are utilized for the production of certain articles, such as cooking ware and the like. These glass ceramics are not totally vitreous amorphous solids, but are devitrified to at least some extent, and include nucleating agents in their formation such that crystallization in at least a portion of their structure is present. Also excluded would be certain glass products having unusual compositions which are based upon other inorganic oxides other than silicon oxides as their major constituent. Included in this group would be materials having as their major components boric oxide, phosphoric oxide and other glass formers.

The word "glass" as used herein is further construed to exclude certain natural and synthetically formed mineral fibers, commonly referred to as mineral wools, mineral cottons and the like. Natural fibers so defined would include asbestos and the like. The synthetic fibers in this group are prepared by blowing air or steam through molten rocks or slags. The slags generally are vitreous by-products, separated from fused metals during melting of ores.

The glasses of the invention are therefore silica glasses. Normally, the preferred silica glasses of the invention are generally those which are economical in nature. These readily available, economic silica glasses would generally have at least about 60 percent silica content. Other oxides would be present in varying amounts, such that the preferred silica glasses of the invention would generally include alkali metal oxides and alkaline earth metal oxides in varying amounts, depending upon the exact composition of the glass. Normally, these glasses also might contain small amounts of aluminum or boric oxides.

From an economic and performance consideration, as will be evident from the examples below, the preferred glass of the invention would be a soda or potash silica glass with the glass commonly characterized as a soda-lime-silica glass being the most readily available, and economically preferred. Aside from the presence of silica, these glasses contain varying amounts of the oxides of aluminum, boron, sodium, potassium, calcium and magnesium. Generally, the sodium and calcium oxides form the predominant amount of the minor constituents, with the major constituent, silica, present in percentages generally greater than 60 percent.

For the purposes of simplicity of this specification, when used, except as otherwise noted, the word "glass" is to be construed within the confines of the above identified limits.

The glass used in the fire retardant material of this invention is required to contain voids or spaces between individual amounts of masses of the glass or, in the alternative, must be soluble so that the solvent could also act as a suspending agent for positioning quantities of the unexpanded form of the perlite between individual solubilized amounts of the soluble glass. The glasses useful for the invention could generally be characterized as glasses present in a divided or permeable form.

Aside from its production in sheet form, many types of glass are produced in what can be called a divided form. These include fibers, small particles, and other similar forms.

Glass in a fibrous form is produced in great quantity as twines, mats and fabrics. The mats currently find use in roofing composition, insulations and the like, and the fabrics as support matrices for certain polymerizable resins which together are technically called fiberglass. Ropes or twines of glass fibers are also commonly used in chopper gun assemblies and concurrently disbursed with the individual components of plural component systems to form fiberglasses and the like within the interiors of molds, or on the surfaces of structures and the like. One of the most commonly used of these glass structures is known as E-grade glass mat, and is used as a reinforcement material in the roofing industry. Glasses, of course, soften and eventually become a mobile liquid over a wide temperature range. This temperature range depends on the chemical composition of the glass and its physical form. Finely divided fibers would be expected to initially lose their structural strength before thicker fibers. The E-grade mat tends to soften between 1500° and 1600° F. and will continue to become less viscous until the individual fibers of the mat essentially coalesce into a monolithic mass of glass.

Other forms of glass useful in the practice of the invention are also produced in great quantities. Ground glass is easily produced by the thermo-shock of rapidly cooling a mass of glass. Glass microspheres are produced both intentionally in certain industrial processes, and as by-products of others. Certain glasses composed only of sodium and silicates are water soluble and are noted as water glasses. These, along with their other alkali metal counterparts are produced in large quantities and find a variety of uses as binders, additives and the like.

The above noted fibers, mats, fabrics, ground glass, microspheres and soluble water glasses all have a physical property in common, in that there are voids between the individual fibers or solid particles, or in the case of solutions of water glass, within the solvent itself, wherein other materials can theoretically be positioned.

I have found by using the unexpanded from of a heat expandable perlite, that I can successfully position a sufficient amount of the perlite in intimate association throughout the glass such that the composition is capable of both expanding to its expanded form when subjected to heat to form an insulation barrier, as well as be present in an amount and be dispersed with the glass such that the perlite and the glass will react at higher temperatures to form a ceramic composition which, in effect, forms a barrier to the propogation of the spread of flame. These properties are obtainable by the use of the unexpanded form of perlite.

Generally, the perlite will initiate expansion at a temperature at or about 1500° F. After expansion above this temperature, the perlite will be in its expanded form and will have a plurality of voids or dead spaces within it which serve as insulative barriers to the propogation of heat through my fire retardant material. In a catastrophic fire, however, temperatures much greater than 1500° F. can be generated. At or about 2000° F., the expanded form of the heat expandable perlite and the glass will begin to form a ceramic. Once formed, this ceramic then serves as a physical barrier to further inhibit the spread of combustion.

Depending on the choice of materials, consistent with the disclosures herein, the above noted temperatures of initiation of formation of the ceramic will vary. In any event, the choice of the materials as disclosed herein will serve to impart to my fire retardant material the above two fire inhibiting properties; that is, both the insulatory property and the formation of a ceramic barrier.

Because I initially start with the unexpanded form of heat expandable perlite, I am able to impregnate or impermeate the glass with a sufficient amount of the heat expandable perlite to form the above noted ceramic. If, in fact, the expanded form of perlite were initially used, the same properties could not be obtained. The expanded form of perlite could not be present in sufficient amount to form a ceramic having properties of the ceramic I achieve utilizing initially the unexpanded form of this material. In order to form the ceramic having the structural properties such that it is capable of maintaining itself as a physical barrier at very high temperatures, i.e. generally above 2000° F., it is necessary to initially use the unexpanded from of the heat expandable perlite.

The unexpanded form of the heat expandable perlite must further be utilized as a particle of sufficiently small size such that upon conversion to its expanded form when subjected to combustion temperatures, it does not dislodge itself from association with the glass due to propulsion from the surface of the glass upon expansion. For the preferred embodiment below, I have found that particle size of 200 mesh or smaller will expand in a manner such that their force of expansion will not cause them to be exploded or propelled away from the glass, whereas generally, unexpanded perlite of about 100 mesh starts to dislodge itself from the glass matrix upon rapid heating.

In certain instances in using my fire retardant material, the use of a binder can augment the properties of the heat expandable perlite and the glass noted above. While the heat expandable perlite and the glass will maintain themselves in an intimate association in normal environments, they could, when subjected to very violent environments, disassociate from each other. Thus, when used as the outer skin of a structure, my fire retardant material would preferredly incorporate a binder to assist in maintaining the unexpanded form of the heat expandable composition in intimate association with the permeable mass of glass.

As candidates for binders would be materials capable of being applied in a fluid state and then being converted to a tacky or solid state. Such conversion could be based on temperature, chemical reactivity, or evaporation of a solvent. In any event, the binder should be chosen such that it assists in maintaining the association of the heat expandable composition and the glass at least at temperatures below initial combustion temperatures of normal flammable structural materials. One of the binders useful in my fire retardant material in fact assists in maintaining this association at temperatures even above such initial combustion temperatures.

As preferred for binders would be asphalts, natural organic polymers and synthetic organic polymers. A more preferred group of binders would be a group consisting of asphalts, vinyl emulsions, latex emulsions, urethanes, acrylic copolymers, ureaformaldehyde, melamine, and soluble alkali metal silicates. Other binders, such as organic starches, proteins and other organic polymers might also be useful in certain applications; however, if these organic binders are chosen, the addition of a suitable preservative necessary to protect these against biological degradation by molds, rots, rust and the like might also be added.

In any event, a binder, if used, would be chosen to suitably hold the beforenoted ingredients of my fire retardant material in intimate association. The binders noted above, however, except for the soluble silicates, are subject to thermal vaporization or decomposition. Those binders which are susceptible to thermal vaporization would, of course, depart upon exposure to combustion temperature. Other if the above noted binders would leave certain residues behind upon exposure to combustion temperatures. With the use of certain organic polymers as a binder, a thermal decomposition product remains upon exposure of the fire retardant material to combustion temperatures. This product, however, does not inhibit the subsequent reactivity of the heat expandable composition and the glass to form the above noted ceramic. The decomposition product in fact assists in maintaining the physical integrity of my fire retardant material prior to the formation of the ceramic product.

If used, the binder should be present in amounts sufficient to impart ambient structural integrity of the fire retardant material without being present in excessive amounts. Amounts from zero percent to approximately sixty percent of the weight of the unexpanded perlite would be chosen.

In most instances when used, the binder would only be used on a weight basis, in amounts equal to or less than the amount of the unexpanded perlite. When urethanes are utilized as the binder and formed in situ around the glass and the unexpanded form of the perlite, application by a spray system is easier if the compounds forming the urethanes are present as sixty percent by weight per forty percent by weight of the unexpanded perlite, because of the viscosity of the spray. In situations where the viscosity of the compounds being applied is not as critical as in spraying, less binder and mass of the unexpanded form of the perlite is preferred.

For use of ureaformaldehydes, melamine, and soluble alkala metal silicates, typically forty percent binder would be used. For use with vinyl emulsions, fifteen percent binder would be used and for asphalts, typically fifty percent would be used.

The temperature at which the unexpanded form of the heat expandable perlite starts to expand is as noted above. The particular glass used would be chosen such that the glass would not soften to the point beyond that wherein its viscosity would decrease below the point necessary to maintain the structural integrity of the material prior to initiation of expansion from the unexpanded form to the expanded form of the perlite. In other words, the glass should hold its physical shape until at least initiation of expansion has begun. Optimally, the viscosity of the glass will start decreasing concurrently with or slightly after expansion of the heat expandable perlite.

Perlite is mined in a variety of locations throughout the United States. After mining, it is sized and the majority of the larger size particles, normally greater than 50 mesh, are expanded in expansion furnaces at temperatures from about 1500° to 2000° F. This expanded material has a variety of uses including fillers for lightweight aggregates, insulation materials and the like. It is also useful neat as an insulating agent, but, of course, it must be confined within some sort of structure.

There is presently little use for the unexpanded perlite left over after the above noted processing. This perlite is generally of a size less than 50 mesh, and is commonly designated as "cyclone", "00" or "000." With the "00" perlite, the substantial majority of the particles are less than 200 mesh, and with the "000", greater than ninety eight percent of it is less than 400 mesh. Because it is a by-product of the other useful forms of perlite, but not, in fact, useful in the same quantities as other forms, it is generally just stockpiled at the processing site and, in certain instances, forms an extreme disposal or storage problem for the producing company.

As mined, perlite contains water incorporated into its mineral matrix. When exposed to the above noted expansion temperature, this water is released from the matrix and explodes into steam, which expands the unexpanded perlite manyfold times, and concurrently reduces its density below 10 lbs. per cu. ft., and in certain instances to as low as 2 lbs. per cu. ft.

I have found that perlite of a mesh size generally less than 100 mesh, will be maintained on or in a permeable glass mass upon expansion from its unexpanded form to its expanded form. Perlite of a larger size will be propelled from the glass when it expands and thus is not useful.

The perlite can be successfully permeated into glass fiber mats or fabrics. Further, the unexpanded perlite can also be suspended in solutions of water glasses which are then allowed to dry. Additionally, when utilized with a suitable binder, unexpanded perlite can be associated with ground glass, microfibers, microspheres and the like.

The perlite can be originally associated with glass using several techniques. One technique utilizes a doctor blade to simply spread the perlite over and into a glass mat or fabric. Because of the above noted size of the unexpanded from of perlite, the fine perlite essentially is forced in or otherwise penetrates into the mat or fabric and is essentially incorporated throughout the total glass matrix. In addition to doctor blading, other "dry" techniques could be used, such as blowing the perlite into the mat or fabric, using a carrier gas as well as vibrating the glass matrix in the presence of perlite.

"Wet" techniques, wherein perlite is suspended in a suitable liquid, could be used. A suspension of perlite could be poured or sprayed onto a supporting glass matrix, or the matrix could be dipped or otherwise wet with the perlite suspension.

The perlite also can be incorporated into a suitable binder and transported into association with the glass concurrently with permeation of a binder into a mass of glass. For example, perlite can be suspended in heat softened asphalt and transported into association with the glass as the asphalt permeates through the glass mat or fabric. Additionally, it could be suspended in suitable solvent, wherein the binder is soluble, such as a carrier solution for latex. The suspension of perlite in binder solution would then be infiltrated through the glass by either pouring or spraying the suspended perlite on the glass, or by dipping the glass into it.

In other binders, such as those wherein the binder if formed via a chemical reaction between two or more components the perlite could be suspended in one, some, or all of the components and appropriately permeated into the glass. In this instance, the binder would be formed in situ within the glass matrix after the perlite had been appropriately deposited there by one or more of the binder precursors or carrier solvents.

If the glass is in a form of an unattached mass such as ground glass, microfilaments or microspheres, the perlite could be premixed dry with the glass and as appropriate binder added to this dry mixture, or the dry mixture added to the appropriate binder. An appropriate dry mixture of the perlite and an unattached glass mass could be sprayed within the carrier fluid, either gas or liquid, and a binder concurrently sprayed, such that all of the components were co-deposited on a receptive surface.

One form of the invention utilizes perlite and an appropriate glass fiber mat held together with asphalt to form a flexible roofing material which can be applied as the outer layer of a roofing structure. A second form utilizes perlite and a glass fiber mat appropriately bonded as a veneer layer to a building material such as plywood sheet or the like. In this instance, it is envisioned that a separate outer roofing structure would be applied on top of the above noted laminate.

In any event, in the fire retardant material the perlite would be present in at least equal weight with the glass. Preferredly the perlite would be present in amounts greater than the weight of the glass. Materials having excellent fire retardant properties are obtained wherein the perlite is present in weights from about 6 or 7 parts-by-weight per one part-by-weight of glass up to wherein the perlite present at saturation quantities with respect to the amount of perlite which can be incorporated within a glass fiber mat or fabric. Optimally, around ten parts of greater perlite by weight per one part glass is presently chosen.

When used with a binder, normally as large a quantity of perlite as can be incorporated in association with the glass following the above guidelines is used, and the binder is present in concentrations with respect to the perlite as noted above. The optimum amount of binder and perlite on a weight by weight basis is governed by the particular binder selected.

While I do not want to be bound by theory, I believe the excellent fire retardant properties of my fire retardant material are achieved as follows. Because I utilize the unexpanded form of a heat expandable composition, I am able to associate an amount of heat expandable perlite with a permeable mass of glass such that, after expansion of the heat expandable perlite, the amount of the perlite present in relationship with the glass is such that a ceramic can be formed. When exposed to combustion after vaporization or decomposition of the binder, if a binder is present, the heat expandable perlite expands to form an insulation barrier composed of the expanded form of the heat expandable perlite surrounded by glass in a sufficient amount that with further increase in temperature, the expanded form of the perlite and the glass react to form a ceramic. The physical integrity, i.e., the ability to support itself, is transferred from the glass matrix to the ceramic as the temperature of my material reaches and then surpasses the ceramic forming temperature. Thus, at all times, my fire retardant material can exist as a self supporting material.

As a support of this theory, I prepared a composite of eight layers for a total thickness of ¼", each layer was composed of 1.9 lbs/100 sq. ft. 20 mil glass mat saturated with perlite using a vinyl latex binder. One side of this composite layer was continuously exposed to 2000° F. flame for one hour. After the one hour exposure, the temperature measured on the cold side was 450° F. On the hot side, the first three layers had converted to a ceramic with some shrinkage. Adjacent to the ceramic layers, the perlite had expanded from its unexpanded form to its expanded form, but the glass mat retained its integrity, still surrounding the expanded perlite. Progressing beyond toward the cold side, we next see the perlite present in its unexpanded form within the glass fiber mat, followed by, on the cold side, the outer layer being as originally formed with the binder still present. A temple stick measuring temperatures between 2000° and 2200° F. was used as a temperature indicator on the hot side.

All of the layers of the above composite retained their physical integrity, either because of the structural strength of the glass mat itself, with or without the binder or conversion to the ceramic. In this test, individual layers were used. I have also found that in a single layer, this same thing happens in essentially a modified scale. In a single layer, the temperature is slowly increased across the thickness of the fire retardant material. The hot side is first to have its perlite expand and first to have the ceramic form. Expansion of the perlite and the formation of the ceramic proceeds as a gradient through the thickness of the material. The binder, if it is used, of course would likewise be present or absent in a gradient as the temperature increases across the thickness of the material. In a single layer the fiber mat with of without binder and/or another form of the glass with a binder would maintain the integrity of the structure at the cold side as the hot side converted to a ceramic and then the ceramic on the hot side would retain the integrity of the structure as the ingredients, which are more distant from the source of the heat, underwent expansion and glass softening and, finally, conversion to ceramic.

Typical examples of use of my invention are as follows. A solution of sodium silicate was mixed with the unexpanded form of the expandable perlite in a mesh size consistent with the invention. The resulting suspension was spread across the surface of a cardboard sheet. After a minimal drying time, the flame from a propane torch was directed against the resulting fire retardant material. After fifteen minutes of such treatment, a ceramic had formed where the flame had impinged, but directly behind it, the cardboard still had not been charred or burned.

A glass mat was impregnated with the perlite of the invention by simply rubbing the perlite into the mat. Upon exposure to a flame, a circular area of ceramic formation was noted, with no flame penetration through the mat. When the mat was treated with a flame without the addition of the perlite, a hole quickly formed where the flame impinged on the mat.

A flexible roofing composition was prepared by admixing 6.2 lbs. of perlite with 6.2 lbs. of heat softened asphalt and spreading over and through a glass fiber mat having a density of 1.9 lbs./100 sq. ft. The resulting composition had a total weight of 14.29 lbs./100 sq. ft. When subjected to combustion by impinging a torch against the surface, initially decomposition of the asphalt was noted followed by charring and then formation of a ceramic. A typical test piece held in a flame for fifteen minutes had a small gray-white colored circle of approximately 3 to 4 inches in width at the point of flame impingement. In this circle the asphalt had decomposed and the very center of the circle had converted to a ceramic. Outside the circle the original black composition showed no effects of being adjacent to the flame test area.

Another typical roofing material utilized the same glass mat noted above, known in the industry as E-grade industrial mat, with 11.34 lbs. of asphalt and 11.34 lbs. of perlite per sq. ft. Flame tests of this material showed results consistent with flame tests of the above material. Both of the above noted roofing materials had excellent flame retardant properties.

As a composition suitable for veneering into a laminate such as pressboard, fiberboard, plywood or the like, 15 parts perlite were suspended in 10 parts water and 5 parts latex acrylic copolymer material. Optionally, 0.5 parts suspending agent could also be utilized. This material was saturated into the 1.9 lbs./100 sq. ft. glass mat, which was pre-positioned on the surface of a piece of ½" plywood. Three layers were built up in this manner. The resulting structure was a plywood veneered with a fire retardant material.

The following structures were prepared and subjected to analagous conditions utilized in the Fire Brand B test of UL 790 testing procedures. All of the following met or exceeded these conditions.

Perlite suspended in a vinyl latex carrier was painted onto a rigid urethane foam. Glass fibers were compressed into the layer. A second perlite vinyl latex layer was painted on and again glass fibers were pressed into it. This was repeated for a third time, resulting in a layer of approximately ⅛" thick. As noted above, it successfully withstood conditions analagous to the Class B portion of the above noted test.

The above test was repeated utilizing a latex carrier—perlite ratio of 75 percent perlite to 25 percent latex carrier. A composite structure ⅛" thick, utilizing 3 layers of 1.5 lb/100 sq. ft. glass mat was formed. After having a propane torch flame impinged in it for one hour, only slight charring of the urethane was noted.

Three layers of a 50/50 perlite/warm asphalt suspension impregnated into a glass mat were used as an underlayment for a pressure treated shake shingle structure. This structure also passed a test analagous to the Class B Fire Brand. In a separate test, the above noted shake shingles were also utilized over space sheeting. Again, the material successfully passed the noted test. Presently, the only known existing pressure treated shingle which can successfully pass this same test is that backed up with steel foil on solid sheeting.

A composition of approximately 150 mil thickness was formed by layering a urethane elastomer with glass impregnated perlite suspended in a water based vinyl emulsion, followed by a second layer of glass, perlite, etc., and a final layer of urethane elastomer. This was applied to a ½" plywood decking. Approximately 90 mils of 150 mil thickness were the perlite-glass-vinyl emulsion layers. This layer also withstood conditions analagous to the above noted test.

The ceramic resulting from high heat exposure of the fire retardant material of my invention shows on microscopic inspection to be a ceramic of many closed cells. The presence of these closed cells impart to this ceramic additional heat insulating properties at extremely high temperatures.

The sodium silicates useful as the permeable mass of glass of my invention can be utilized as water solutions or as dehydrated, or partially dehydrated, solids. Both of these physical forms are commercially available. If used in a solid form, the sodium silicates could be appropriately dry mixed with the perlite and the resulting mixture then used in a manner consistent with other solid forms of glass described herein. Alternately, such a dry mixture might then be admixed with water and used. When used as a solution, sodium silicate could be mixed directly with the perlite or it could be step-wise or concurrently applied to a surface with the perlite.

My fire retardant material as described herein utilizes the insulated properties of the expanded form of the heat expandable perlite after the expansion temperature has been surpassed. In certain instances, it might be desirable to incorporate a previously expanded insulation material to provide for low temperature insulating properties. In certain structural steel structures, it is desirable to protect the structural steel from exposure to temperatures in the range of about 500° F. and above. A minor fire in one of these steel structures might not do catastrophic damage to the whole structure, but it might locally expose certain structural steel elements to temperatures of about 500° to 700° F. These temperatures could initiate softening of tempered steel components and thus are undesirable. This normally is below the temperatures at which the heat expandable perlite of my invention would expand into a highly insulative expanded form. By incorporating amounts of previously expanded insulatory material such as expanded perlite, or other insulatory materials into my fire retardant material, structural steel components as well as other structural materials coated with such a material would be protected against low temperatures as well as high temperature exposures.

I claim:

1. A fire retardant material which comprises:
   a quantity of a permeable mass of silica glass;
   a quantity at least equal to the weight of said permeable mass of glass of the unexpanded form of heat expandable perlite, said quantity of said unexpanded perlite present as a multiplicity of particles of a particle size less that 100 mesh, said particles permeated among and associated with said permeable mass of glass, said particles being of a size sufficiently small to be retained in said association with said permeable mass of glass upon conversion of said composition from said unexpanded form when subjected to heat.

2. The material of claim 1 wherein:
   said perlite is present as particles sized smaller than 200 mesh.

3. The material of claim 2 wherein:
   said permeable glass is chosen from the group consisting of glass fiber mat, glass fiber fabric, glass fiber filaments, ground glass, glass microspheres and soluble sodium silicate solutions and powders.

4. The material of claim 3 wherein:
   said glass is chosen from the group consisting of glass fiber mat, glass fiber fabric, glass fiber filaments, ground glass and glass microspheres.

5. The material of claim 4 wherein:
said heat expandable perlite expands at or above 1500° F. and said expanded perlite and said mass of glass form a ceramic structure at or above 2000° F.

6. The material of claim 5 wherein:
a binding agent capable of maintaining said perlite in association with said glass at at least ambient temperature.

7. The material of claim 6 wherein:
said quantity of glass is at least 7 parts by weight of 100 total parts by weight of said material.

8. The material of claim 7 wherein:
said glass is a glass fiber mat.

9. The material of claim 8 wherein:
said binder is chosen from the group consisting of organic polymers, asphalt and soluble alkalai metal silicates.

10. The material of claim 9 wherein:
said binder is chosen from the group consisting of asphalt, urethane elastomers, vinyl emulsions, latex emulsions, acrylic copolymers, ureaformaldehyde, melemine, and soluble alkalai metal silicates.

11. The material of claim 10 wherein:
said binder is an urethane elastomer.

12. The material of claim 10 wherein:
said binder is a vinyl emulsion.

13. The material of claim 10 wherein:
said quantity of perlite is present in an amount by weight at least equal to about 40 percent of the amount by weight of said binder.

14. The material of claim 10 wherein:
said binder is a latex emulsion.

15. The material of claim 10 wherein:
said binder is an asphalt.

16. A fire retardant material which comprises:
a quantity of soda-lime-silica glass fibers;
a quantity at least equal to the weight of said glass fibers of the unexpanded form of heat expandable perlite;
said quantity of unexpanded perlite present as a multiplicity of particles, said particles permeated among and associated with said glass fibers, said particles being of a size less than 100 mesh so as to be retained in said association with said glass fibers upon conversion of said perlite from said unexpanded form to its expanded form when subjected to heat.

17. The material of claim 16 wherein:
said perlite is of a particle size of 200 mesh or less.

18. The material of claim 17 wherein:
at least about 6 pounds of said unexpanded perlite being present for about every two pounds of said glass fiber.

19. The material of claim 18 including:
a quantity of a binder capable of maintaining said perlite in association with said glass fibers.

20. The material of claim 19 wherein:
said glass fibers are formed as a glass fiber mat having a density of at least 0.9 lbs. per 100 sq. ft.

21. The material of claim 1 wherein:
said material is bonded to the surface of a structural component as a veneer layer.

* * * * *